A. F. JENKINS.
ACETYLENE GENERATOR.
APPLICATION FILED FEB. 7, 1918.
1,317,706.
Patented Oct. 7, 1919.
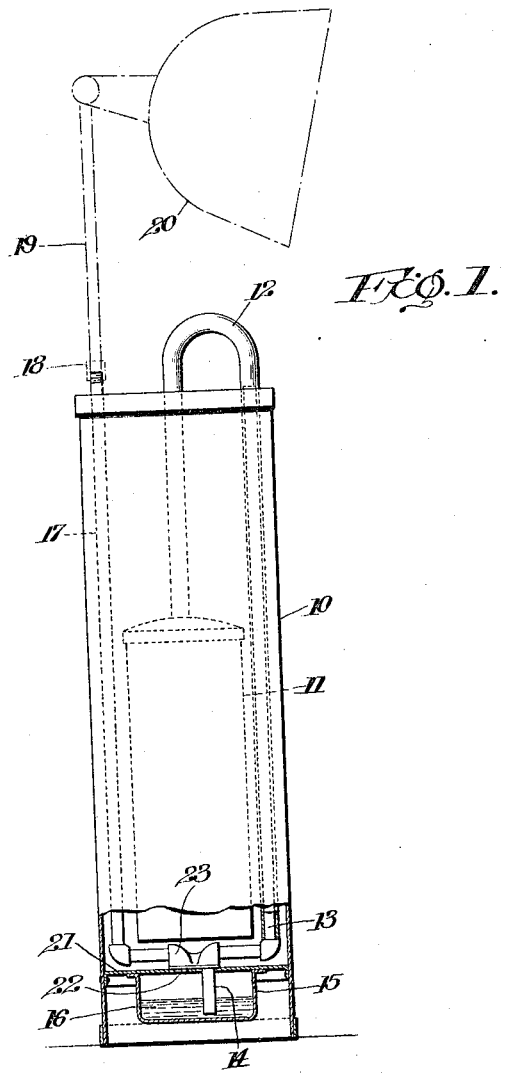
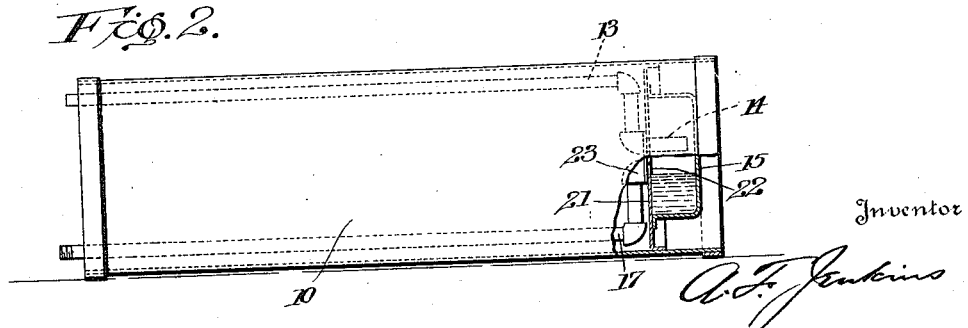
Inventor
A. F. Jenkins
Attorney

UNITED STATES PATENT OFFICE.

ALEXANDER F. JENKINS, OF BALTIMORE, MARYLAND.

ACETYLENE-GENERATOR.

1,317,706.   Specification of Letters Patent.   Patented Oct. 7, 1919.

Application filed February 7, 1918. Serial No. 215,837.

*To all whom it may concern:*

Be it known that I, ALEXANDER F. JENKINS, of the United States, and residing at Baltimore, State of Maryland, have invented certain new and useful Improvements in Acetylene-Generators, of which the following is a specification.

In producing acetylene gas it is customary to pass the gas through water to purify or wash it, and also to cool it. In portable generators the washing compartment has usually been placed at the bottom of the generator, and it has been more or less difficult to remove and replace the water and to regulate the amount of water. The present improvement relates to simplifying the means for introducing and removing the water and regulating the normal amount. The special means for introducing and removing water heretofore used are dispensed with and one of the pipes for delivering the gas to the washer or receiving the gas from the washer is utilized for receiving and discharging the water and also for determining the amount of water to remain in the washing compartment.

Referring to the drawing:

Figure 1 is an elevation partly broken away of a portable acetylene generating tank surmounted by a burner or torch;

Fig. 2 shows the tank on its side in position to discharge surplus water from the washing compartment.

Referring to the drawing, 10 indicates a tank of the usual construction, 11 a generator within the tank, 12 a goose-neck pipe receiving the gas from the generator and conducting it to a pipe 13 which communicates with the pipe 14 and discharges the gas near the bottom of a washing compartment 15 which is filled with water to some distance above the bottom of the pipe 14. The pipe 12 telescopes over the pipe 13 and the joint between the two is sealed with water in the tank 10 which rises to some distance between the pipes 12 and 13. The entire generator 11, together with the pipe 12 may be lifted out of the tank, as usual, to permit renewal of the carbid in the generator.

The gas arising through the water 16 in the washing compartment passes out through the pipe 17, which preferably terminates in a joint 18 a short distance above the tank. An extension 19 may carry a lamp 20 or lead to any point to which it is desired to supply the gas. As shown, the washing compartment 15 is attached to the bottom 21 of the tank 10, extending downward therefrom, and it is closed with the exception of the inlet pipe 14 and an opening 22 near the center of the bottom 21 to which the outlet pipe 17 is connected. As shown a pipe fitting 23 is centrally attached to the bottom 21 and the pipes 13 and 14, also 17, are connected to this fitting.

After removing the generator 11, and disconnecting the lamp at 18, the washing compartment may be emptied quickly by turning the tank bottom upward, permitting the water to run out through the opening 22 in the pipe 17, the air entering through the pipes 13 and 14. Fresh water is then poured into the washing compartment through either the pipe 13 or the pipe 17 in sufficient quantity to at least half fill the compartment. To retain just the right amount of water in the compartment, the tank is then laid on its side with the pipe 17 down in bottom position, as shown in Fig. 2, in which position the excess water will promptly run out of the opening 22, what remains being sufficient for the purpose of cleansing and cooling the gas, but not enough to materially retard the flow of gas from the generator.

Heretofore it has been customary to provide an overflow pipe extending from the side of the compartment 15 out through the outer wall of the tank 10 and to provide this pipe with a removable cap or plug. This arrangement was somewhat expensive and was liable to create trouble through loss of the cap or plug, as these portable acetylene outfits are subjected to rough usage and more or less careless handling. By placing the outlet 22 at the proper point, I am enabled to measure and retain in the washing compartment the amount of water which is most desirable for the purpose without resorting to any special apparatus for this purpose. It will be evident that this purpose could be accomplished by turning the tank into the reverse of the position shown in Fig. 2 and permitting the excess water to escape through the inlet pipe 13, 14, provided the pipe 14 be located properly in the compartment 15. Preferably, the pipe 14 and the opening 22 are symmetrically arranged in the center of the compartment 15 so that either may be used to measure the supply of water to remain in the compartment. This arrangement serves to prevent any mistake in selecting the proper outlet pipe as the tank may be laid down with either pipe at the bottom.

It is not always necessary that the pipe 14 should extend below the water level in the pan 15. The gas may sometimes be discharged above the water and pass over it to the outlet. In such case the water acts as a condenser, to cool the gas, collect dust, and keep in solution products which might otherwise solidify and be difficult to get rid of. The tank is preferably rectangular or square in cross-section, as shown, and the inlet and outlet openings to the washing or condenser compartments are arranged to measure the water when the tank is laid on one of its sides.

Having thus described my invention what I desire to secure by Letters Patent is:

1. The combination with an acetylene generating tank, of a washing or condenser compartment through which the gas from the generator is passed, said compartment having gas inlet and outlet openings so located centrally in the top of the compartment that either opening will serve as a measuring overflow outlet for said compartment when the tank is laid on its side, whereby the proper amount of water for said compartment may be determined.

2. The combination with an acetylene generating tank, of a washing or condenser compartment in the bottom of the tank, said compartment being closed with the exception of inlet and outlet openings for the gas, a pipe leading from the inlet opening nearly to the bottom of the compartment, and a pipe leading from the outlet opening to the exterior of the tank, the said inlet and outlet openings being so located that the proper amount of water for said compartment will remain in the compartment when the tank is laid on its side and the excess water discharged from either opening.

In testimony whereof I affix my signature.

ALEXANDER F. JENKINS.

Copies of this patent may be obtained for five cents each, by addressing the "Commissioner of Patents, Washington, D. C."